№ 3619

C. H. Emerson & J. F. Emerson's Bolt Heading Machine.

C. H. Emerson
John F. Emerson 115
3390 Reissued
Jaggar

Witnesses.
Pat. T. Kinnison
Theodore Walcott

Reissued

Aug 24 1869

UNITED STATES PATENT OFFICE.

C. H. EMERSON AND JOHN F. EMERSON, OF NEW YORK, N. Y.

IMPROVED MACHINE FOR HEADING BOLTS.

Specification forming part of Letters Patent No. 89,211, dated April 20, 1869; reissue No. 3,619, dated August 24, 1869.

*To all whom it may concern:*

Be it known that we, C. H. EMERSON and J. F. EMERSON, of the city, county, and State of New York, have invented a new and useful Improvement in Bolt-Heading Machines, of which the following is a full, clear, and exact description, reference being had to the accompanying drawings, forming part of this specification, and in which—

Figure 1:
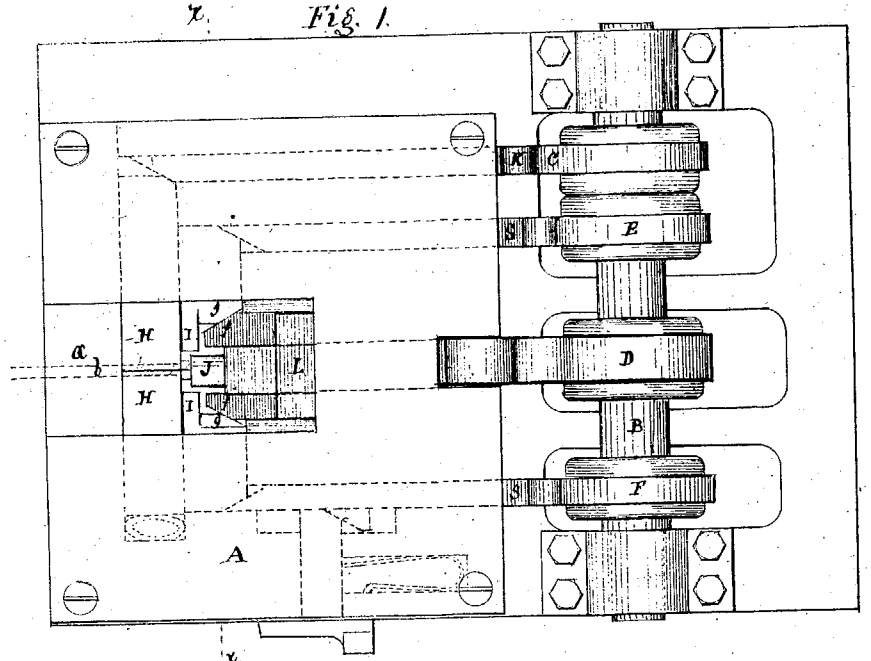
Figure 2:
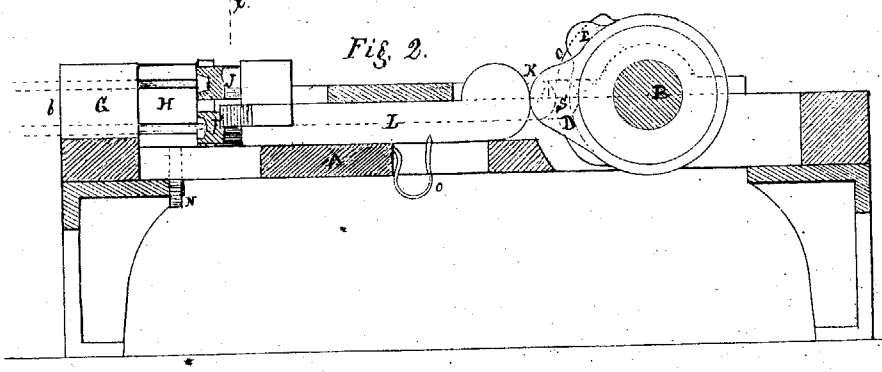
Figure 3:
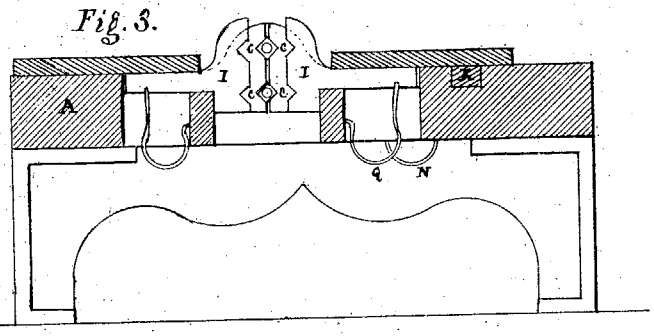

Figure 1 represents a plan of a bolt-heading machine constructed in accordance with our improvements; Fig. 2, a central longitudinal vertical section of the same, and Fig. 3 a transverse section thereof through the line *x x* in Fig. 1.

Similar letters of reference indicate corresponding parts.

This our improvement embraces in one machine the gripers, roughing and finishing headers, and siding-dies, so arranged and operating that the bolt to be headed, being first griped in position, is upset at the end by the roughing-header into a conical or rivet-head shape, and the bolt being released after the thrust of of the header, it is again griped opposite to the finishing-header, by which second header a rounded or other finish is given to the top of the head, and alternately with the blows thus impinged upon the top the siding-dies act upon the sides of the head, truly squaring and finishing them, thus making a most perfectly formed and solid head upon the bolt.

Referring to the drawings, A represents the bed of the machine, and B the driving-shaft, which is mounted in proper bearings thereon. On this shaft are arranged and secured the cams C, D, E, and F, the offices of which will be presently explained.

The bar from which the bolts are to be made, being properly heated, is first introduced along an upper groove made in one side of a vertical slot, *b*, running through a front guide, G, and also through between the gripers H H up to or against the bottom of the cavity in the roughing-header J, which gages the quantity of material to form the required head for the bolt. The gripers H H, or one of them, are then pushed home against the bar for the purpose of holding it in position against the thrust of the header, which is done by means of the cam C, acting against and moving a sliding bar, K, having a wedge-shaped end which bears on the outer portion of the griper, so as to give it the necessary lateral thrust against the bar. The roughing-header J is then impinged against the end of the heated bar by the action of the cam D against the rounded end of the sliding stock L, which sliding stock is made to carry both the roughing and the finishing headers. The die of the roughing-header is so cupped or shaped that it gives a rivet-head formation to the end of the bar, which formation, it is found from practice, secures a more solid and perfect square or polygonal shaped head, on suitable formers or siding-dies being applied to finish the head, than any other preparatory formation. The head of the bolt having thus received its preparatory form, as shown in Fig. 2, the heading-stock L retires, and the first pair of siding-dies, *c c*, in the carriers I I are made to impinge the sides of the head by the simultaneous action of the cams E and F upon the sliding bars S S, the wedge-shaped ends of which impart the necessary lateral movement to the carriers of the siding-dies. After this the carriers I I and the gripers H H recede or open, which enables the workman to shift the bar or bolt from the top groove in the guide G to a lower groove therein, when the same operation is gone through as before, only in connection with the finishing-header J′ and finishing siding-dies *e e* in the carriers I I, the finishing siding-dies being somewhat more prominent than the roughing siding-dies, and on the opening of the gripers H H at each revolution of the cam-shaft B the bar or bolt may receive a partial turn upon its axis by the workman, so as to repeat the compressing or finishing operation on a changed position of the surfaces. The gripers, heading-stock, and siding-dies, when relieved from the action of the cams, are thrown back or made to recede by means of springs N, O, P, and Q, of any suitable form or character; but to prevent damage to the parts in case the springs should fail to act promptly—as, for instance, in case the carriers I I of the siding-dies should not retire in proper time for the headers to make their advance stroke—the forward portion of the heading-stock L is formed or provided with wedges or inclined surfaces *f f*, which, as the headers advance, act against corresponding inclines, *g g*, attached to the carriers I I of the siding-dies, and force them back should they not have previously retired by the action of the springs. After the bolt has been headed it is cut off from the bar by any suitable cutter, and one may be readily attached to the machine for that purpose, as indicated in the drawings, and in the same manner succeeding bolts may be formed, headed, and cut off till the bar is worked up.

A machine as herein described has been constructed by us, and was found to work well in practice. Nevertheless we do not confine ourselves to the exact arrangement and construction of the parts herein set forth, as these may be changed or modified in various ways without thereby changing the principle or character of the device. Thus the header J, instead of being placed vertically over the header J′, may be to one side of it, and may be operated by a separate sliding stock and cam; or the machine may be constructed with only one pair of siding-dies, or both headers may be mounted upon a revolving carrier attached to the sliding stock and changeable at the will of the operator, and other changes might be suggested and still be within the purview of the invention.

Having thus described our invention, what we claim as new, and desire to secure by Letters Patent, is—

1. The combination of roughing and finishing headers J and J′ with gripers H H and siding-dies attached to the carriers I I, arranged and operating first to roughly form the head of the bolt upon the bar and then to finish it, substantially as specified.

2. In combination with the above, the inclined faces or bearings *f f* on the forward end of the heading-stock L and the inclined faces or bearings *g g*, attached to the carriers of the I I of the siding-dies for retracting the said carriers by the action of the heading-stock L, substantially as specified.

C. H. EMERSON.
JOHN F. EMERSON.

Witnesses:
JAS. T. KINNISON,
THEODORE WALCOTT.